United States Patent
Clarke et al.

(10) Patent No.: US 10,793,957 B2
(45) Date of Patent: Oct. 6, 2020

(54) CLOSED LOOP SYSTEMS AND METHODS FOR RECYCLING LEAD ACID BATTERIES

(71) Applicant: Aqua Metals Inc., Alameda, CA (US)

(72) Inventors: Stephen R. Clarke, Orinda, CA (US); Robert Lewis Clarke, Orinda, CA (US); Brian Dougherty, Emeryville, CA (US)

(73) Assignee: AQUA METALS INC., Alameda, CA (US)

( * ) Notice: Subject to any disclaimer, the term of this patent is extended or adjusted under 35 U.S.C. 154(b) by 80 days.

(21) Appl. No.: 15/573,393

(22) PCT Filed: May 13, 2016

(86) PCT No.: PCT/US2016/032334
§ 371 (c)(1),
(2) Date: Nov. 10, 2017

(87) PCT Pub. No.: WO2016/183429
PCT Pub. Date: Nov. 17, 2016

(65) Prior Publication Data
US 2018/0355494 A1    Dec. 13, 2018

Related U.S. Application Data

(60) Provisional application No. 62/160,849, filed on May 13, 2015, provisional application No. 62/161,062, (Continued)

(51) Int. Cl.
C25C 1/18    (2006.01)
C25C 7/02    (2006.01)
(Continued)

(52) U.S. Cl.
CPC ............. *C25C 1/18* (2013.01); *C25C 7/007* (2013.01); *C25C 7/02* (2013.01); *C25C 7/04* (2013.01);
(Continued)

(58) Field of Classification Search
CPC ...................................................... C25C 1/18
See application file for complete search history.

(56) References Cited

U.S. PATENT DOCUMENTS

| | | | |
|---|---|---|---|
| 1,148,062 A | 7/1915 | Tucker et al. | |
| 1,334,419 A | 3/1920 | Tainton | |

(Continued)

FOREIGN PATENT DOCUMENTS

| | | |
|---|---|---|
| CA | 1308057 | 9/1992 |
| CA | 1310837 | 12/1992 |

(Continued)

OTHER PUBLICATIONS

Machine translation of Strunnikov et al, obtained at http://worldwide.espacenet.com (Year: 1991).*

(Continued)

*Primary Examiner* — Harry D Wilkins, III
(74) *Attorney, Agent, or Firm* — Umberg Zipser LLP

(57) ABSTRACT

A closed loop electrochemical process of recovery of high-purity lead uses continuous formation of adherent lead on a cathode from an electrolyte that is used to dissolve desulfated lead paste. Preferred cathodes include aluminum containing cathodes that are operated in methane sulfonic acid to produce a micro- or nanoporous mixed matrix metallic composition and lead dioxide formation at the anode is avoided using appropriate anode configurations or operating conditions

17 Claims, 2 Drawing Sheets

Related U.S. Application Data filed on May 13, 2015, provisional application No. 62/161,068, filed on May 13, 2015.

(51) Int. Cl.
    *C25C 7/04*    (2006.01)
    *H01M 10/06*   (2006.01)
    *H01M 10/54*   (2006.01)
    *C25C 7/00*    (2006.01)

(52) U.S. Cl.
    CPC ........... *H01M 10/06* (2013.01); *H01M 10/54* (2013.01); *Y02P 10/212* (2015.11); *Y02W 30/84* (2015.05)

(56) References Cited

U.S. PATENT DOCUMENTS

| | | | |
|---|---|---|---|
| 1,752,356 A | 4/1930 | Smith et al. | |
| 1,759,494 A | 5/1930 | Tainton | |
| 1,911,604 A | 5/1933 | Calbeck | |
| 1,942,208 A | 1/1934 | Gamichon | |
| 2,166,367 A * | 7/1939 | Norris | B07B 1/4618 |
| | | | 101/150 |
| 2,655,472 A | 10/1953 | Hilliard et al. | |
| 3,153,590 A | 10/1964 | Storchheim | |
| 3,262,868 A * | 7/1966 | Juda | B01D 61/44 |
| | | | 204/265 |
| 3,395,010 A | 7/1968 | Shoeld | |
| 3,616,277 A | 10/1971 | Adamson | |
| 3,647,545 A | 3/1972 | Mao | |
| 3,772,003 A | 11/1973 | Gordy | |
| 3,860,509 A | 1/1975 | Emmett, Jr. | |
| 4,035,242 A | 7/1977 | Brandt | |
| 4,097,354 A | 6/1978 | Ginatta | |
| 4,107,007 A | 8/1978 | Gaumann et al. | |
| 4,118,219 A | 10/1978 | Elmore et al. | |
| 4,128,460 A | 12/1978 | Nishimura et al. | |
| 4,159,231 A | 6/1979 | Smith et al. | |
| 4,222,769 A | 9/1980 | Okuda et al. | |
| 4,229,271 A | 10/1980 | Prengaman et al. | |
| 4,269,810 A | 5/1981 | Kolakowski | |
| 4,460,442 A | 7/1984 | Ducati | |
| 4,650,553 A | 3/1987 | Felgendreger et al. | |
| 4,652,349 A | 3/1987 | Behringer et al. | |
| 4,769,116 A | 9/1988 | Olper et al. | |
| 4,849,059 A | 7/1989 | Deresh et al. | |
| 4,927,510 A | 5/1990 | Olper et al. | |
| 4,944,851 A | 7/1990 | Cordani et al. | |
| 5,106,466 A | 4/1992 | Olper et al. | |
| 5,124,008 A | 6/1992 | Rendall et al. | |
| 5,211,818 A | 5/1993 | Moure, Jr. et al. | |
| 5,230,779 A | 7/1993 | Martin | |
| 5,262,020 A | 11/1993 | Masante et al. | |
| 5,429,661 A | 7/1995 | Khodov et al. | |
| 5,514,263 A | 5/1996 | Spijkerman et al. | |
| 5,520,794 A | 5/1996 | Gernon | |
| 5,750,019 A | 5/1998 | Olper | |
| 5,827,347 A | 10/1998 | Margulis | |
| 5,928,488 A | 7/1999 | Newman | |
| 6,183,619 B1 | 2/2001 | Gillman et al. | |
| 6,428,676 B1 | 8/2002 | Onuoha | |
| 6,679,471 B2 | 1/2004 | Domeier et al. | |
| 6,860,983 B2 | 3/2005 | Bellino et al. | |
| 7,368,043 B2 | 5/2008 | Mohanta et al. | |
| 7,507,496 B1 | 3/2009 | Kinsbursky et al. | |
| 8,323,595 B1 | 12/2012 | Smith et al. | |
| 8,409,421 B2 | 4/2013 | Olper et al. | |
| 8,580,414 B2 | 11/2013 | Clarke | |
| 2004/0004003 A1 | 1/2004 | Hesse | |
| 2004/0140222 A1 | 7/2004 | Smedley et al. | |
| 2004/0222085 A1 | 11/2004 | Mohanta et al. | |
| 2006/0091017 A1 | 5/2006 | Lam | |
| 2008/0128293 A1 | 6/2008 | Mohanta et al. | |
| 2010/0043600 A1 | 2/2010 | Martini | |
| 2011/0033760 A1 * | 2/2011 | Clarke | H01M 2/38 |
| | | | 429/428 |
| 2011/0083970 A1 | 4/2011 | Olper et al. | |
| 2011/0265969 A1 | 11/2011 | Liu et al. | |
| 2014/0131219 A1 | 5/2014 | Fassbender et al. | |
| 2014/0131220 A1 | 5/2014 | Fassbender et al. | |
| 2015/0368750 A1 | 12/2015 | Spence | |
| 2016/0294024 A1 | 10/2016 | Clarke et al. | |
| 2016/0308261 A1 | 10/2016 | Tyagi et al. | |
| 2017/0159191 A1 | 6/2017 | Clarke et al. | |
| 2017/0352927 A1 | 12/2017 | Dougherty et al. | |
| 2018/0069276 A1 | 3/2018 | Clarke et al. | |
| 2018/0127852 A1 | 5/2018 | Clarke et al. | |
| 2018/0127888 A1 | 5/2018 | Clarke et al. | |

FOREIGN PATENT DOCUMENTS

| | | | | |
|---|---|---|---|---|
| CN | 1470675 A | 1/2004 | | |
| CN | 1846005 A | 10/2006 | | |
| CN | 101012514 A | 8/2007 | | |
| CN | 101250720 A | 8/2008 | | |
| CN | 101335370 A | 12/2008 | | |
| CN | 101899576 A | 12/2010 | | |
| CN | 101918600 A | 12/2010 | | |
| CN | 101956214 A | 1/2011 | | |
| CN | 102146572 A | 8/2011 | | |
| CN | 102560535 B | 7/2012 | | |
| CN | 1026188884 | 8/2012 | | |
| CN | 103509949 A | 1/2014 | | |
| CN | 104039991 A | 9/2014 | | |
| CN | 104532302 A | 4/2015 | | |
| CN | 105981212 A | 9/2016 | | |
| CN | 107112606 A | 8/2017 | | |
| EP | 0038366 | 10/1981 | | |
| EP | 0724306 | 7/1996 | | |
| FR | 2207997 A1 | 6/1974 | | |
| IN | 59250 | 12/1957 | | |
| JP | 5493626 | 7/1979 | | |
| JP | 5848645 | 3/1983 | | |
| JP | H9-13189 | 1/1997 | | |
| JP | 2001017942 A | 1/2001 | | |
| SU | 1151595 A | 4/1985 | | |
| SU | 1675393 A1 * | 9/1991 | | C25C 1/18 |
| WO | 9214866 A1 | 9/1992 | | |
| WO | 9533756 A1 | 12/1995 | | |
| WO | 9966105 A1 | 12/1999 | | |
| WO | 2007044852 A2 | 4/2007 | | |
| WO | 2008044852 A1 | 4/2008 | | |
| WO | 2013152260 A1 | 10/2013 | | |
| WO | 2014076544 A1 | 5/2014 | | |
| WO | 2014076547 A1 | 5/2014 | | |
| WO | 2015057189 A1 | 4/2015 | | |
| WO | 2015077227 A1 | 5/2015 | | |
| WO | 2015084950 A1 | 6/2015 | | |
| WO | 2016081030 A1 | 5/2016 | | |
| WO | 2016130675 A1 | 8/2016 | | |
| WO | 2016183428 A1 | 11/2016 | | |
| WO | 2016183429 A1 | 11/2016 | | |
| WO | 2016183431 A1 | 11/2016 | | |
| WO | 2017096209 A1 | 6/2017 | | |

OTHER PUBLICATIONS

Lyakov et al, Desulphurization of damped battery paste by sodium carbonate and sodium hydroxide, Journal of Power Sources, vol. 171, No. 2, Sep. 2007, pp. 960-965 (Year: 2007).*

Gircis et al, Electrochemical phenomena in aqueous electrowinning of lead, Journal of Applied Electrochemistry, vol. 17, No. 6, Nov. 1987, pp. 1234-1245 (Year: 1987).*

Sonmez et al, Leaching of waste battery paste components. Part 1: Lead citrate synthesis from PbO and PbO2, Hydrometallurgy, vol. 95, No. 1-2, Jan. 2009, pp. 53-60 (Year: 2009).*

Ferracin et al, Lead recovery from a typical Brazilian sludge of exhausted lead-acid batteries using an electrohydrometallurgical process, Hydrometallurgy, vol. 65, No. 2-3, Sep. 2002, pp. 137-144 (Year: 2002).*

(56) References Cited

OTHER PUBLICATIONS

Evertsson et al, The thickness of native oxides on aluminum alloys and single crystals, Applied Surface Science, vol. 349, Sep. 2015, pp. 826-832 (Year: 2015).*
Atanasova et al., "Desulpherization of lead cake by sodium carbonate and sodium hydroxide," Journal of the University of Chemical Technology and Metallurgy, 2008; 43(2):267-272.
Bandanoiu et al., Study Concerning PbO Solubility in NaOH Solution for the Treatment of Sulfate-oxide Pastes Obtained from Dismantling used Leadacid Batteries, ResearchGate, https://www.researchgate.net/publication/259571644_Study_Concerning_PbO_Solubility_in_NaOH_Solution_for_the_Treatment_of_Sulfate-oxide_Pastes_Obtained_from_Dismantling_used_Lead-acid_Batteries, Jan. 2013, vol. 64, No. 9, pp. 1004-1010.
Birk, "Lead, Pb2+", http://www.public.asu.edu/~jpbirk/qual/qualanal/lead.html, Feb. 2002, accessed on May 9, 2018, evidence of existence as prior art supported by https://web.archive.org/web/20020209174305/http://www.public.asu.edu/~jpbirk/qual/qualanal/lead.html.
Genders, David, "Electrochemical Salt Splitting," Electrosynthesis, Watts New Quarterly Newsletter, Sep. 1995: 1(1); 8 pgs.
International Preliminary Report on Patentability for PCT application No. PCT/US2016/032334 dated Mar. 13, 2017; 14 pgs.
International Search Report and Written Opinion for PCT application No. PCT/US2016/032334 dated Sep. 12, 2016; 17 pgs.
Second Written Opinion for PCT applicationNo. PCT/US2016/032334 dated May 22, 2017; 4 pgs.
Jordan, Manfred, "Chapter 8—Electrodeposition of Lead and Lead Alloys," Modern Electroplating, Fifth Edition; 2010 John Wily & Sons, Inc.; pp. 249-263.
Li et al., "Electrodeposited lead dioxide coatings," Chem Soc Rev, 2011; 40:3879-3894.
Madkour, "Electrolytic separation of lead and its dioxide from carbonate ore residiuum," Indian Journal of Chemical Technology, Nov. 1995; 2:343-344.
Malak et al., "Comparative analysis of two processes for desulphurization of battery paste," JAMME, vol. 55, Issue 2, Dec. 2012, pp. 855-859.
Pletcher et al., "A novel flow battery—A lead-acid battery based on an electrolyte with soluble lead(II): V. Studies of the lead negative electrode," Journal of Power Sources, May 2008;180(1):621-629.
Sun, et al., "Structural and Morphological Evolution of Lead Dendrites during Electrochemical Migration," Scientific Reports, Nov. 15, 2013; 3(3227); 6 pgs.
Tyagi, A zero lead pollution and economical recycling process for lead-acid batteries utilizing electrowinning in basic medium, 4th International Lead Conference, http://4islc.conferenceworks.com.au/presentations/a-zero-lead-pollution-and-economical-recycling-process-for-lead-acid-batteries-utilizing-electrowinning-in-basic-medium/, Downloaded Oct. 13, 2015, 2 pages.
Vaysgant et al., "A low-temperature technique for recycling lead/acid battery scrap without wastes and with improved environmental control," Journal of Power Sources, Feb. 1995; 53(2):303-306.
Walsh, et al. "Versatile electrochemical coatings and surface layers from aqueous methanesulfonic acid," Surface & Coatings Technology, 2014; 259:676-697.
Wong et al., "Lead electrodeposition from very alkaline media," Electrochemica Acta, Nov. 2005; 51(4):619-626.
U.S. Pat. No. 292,753, Jan. 29, 1884, Kessler et al. (IDS form would not accept number under U.S. Patents).
Nguyen, et al., "More Environmental Friendly Method of Lead Recycling from Waste Battery Paste—an Electrochemical Investigation," 2003, Annual Report of FY 2002, The core University program between Japan Society for the Promotion of Science (JSPS) and National Centre for Natural Science and Technology (NCST); pp. 38-45.
Buzatu et al., "Studies on mathematical modeling of the leaching process in order to efficiently recover lead from the sulfate/oxide lead paste," Waste Management, Feb. 2017; 60:723-733.
Carlos, et al., "Study of the influence of glycerol on the cathodic process of lead electrodeposition and on its morphology," J. Power Sources, Jan. 2001; 92:56-64.
Carlos et al., "Voltammetric study of lead electrodeposition in the presence of sorbitol and morphological characterization," May 2003; 117:179-186.
Carlos, et al., "Voltammetric and morphological study of lead electrodeposition on copper substrate for application of a lead-acid batteries," J. Power Sources, May 2004; 132(1-2):261-265.
International Preliminary Report on Patentability for Application No. PCT/US2014/066142, dated Mar. 8, 2016; 43 pgs.
International Search Report and Written Opinion for Application No. PCT/US2014/066142, dated Mar. 24, 2015; 16 pgs.
International Preliminary Report on Patentability for Application No. PCT/US2016/032332, dated Sep. 4, 2017; 26 pgs.
International Search Report and Written Opinion for Application No. PCT/US2016/032332, dated Sep. 12, 2016; 18 pgs.
International Preliminary Report on Patentability for Application No. PCT/US2016/032338, dated May 19, 2017; 7 pgs.
International Search Report and Written Opinion for Application No. PCT/US2016/032338, dated Oct. 21, 2016; 17 pgs.
International Preliminary Report on Patentability for Application No. PCT/US2015/030626, dated Mar. 7, 2017; 12 pgs.
International Search Report and Written Opinion for Application No. PCT/US2015/030626, dated Sep. 10, 2015; 16 pgs.
International Preliminary Report on Patentability for Application No. PCT/US2016/064697, dated Feb. 19, 2018; 18 pgs.
International Search Report and Written Opinion for Application No. PCT/US2016/064697, dated Mar. 10, 2017; 14 pgs.
Buzatu et al., "Processing oxidic waste of lead-acid batteries in order to recover lead," Asia-Pac. J. Chem. Eng., 2015; 10:125-132.
Wu et al., "Fundamental study of lead recovery from cerussite concentrate with methanesulfonic acid (MSA)," Hydrometallurgy, 2014; 142:23-35.
Notification of the First Office Action for China Application No. 201680080516.9, dated Jul. 2, 2019, 09 Pages.

* cited by examiner

CLOSED LOOP SYSTEMS AND METHODS FOR RECYCLING LEAD ACID BATTERIES

This application claims the benefit of priority to U.S. provisional applications having Ser. No. 62/160,849, filed on May 13, 2015, Ser. No. 62/161,062, filed on May 13, 2015, and Ser. No. 62/161,068, filed on May 13, 2015.

FIELD OF THE INVENTION

The field of the invention is recycling of lead acid batteries and processing of other materials containing lead salts.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art. Moreover, all publications and patent applications identified herein are incorporated by reference to the same extent as if each individual publication or application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Like many other metals (e.g., copper, gold, silver, zinc, etc.), lead can be recovered by electrowinning, from various lead containing materials, and especially from paste of lead acid batteries (LABs). Most typically, at least some of the lead paste is dissolved in an electrolyte, and the resulting solution is then subjected to electrolytic recovery of elemental lead at the cathode. While conceptually relatively simple, economic recovery of lead from battery paste in an environmentally benign manner has remained a significant challenge, particularly where lead is to be recovered at high yield and high purity.

For example, WO 2015/084950 describes a process in which lead paste from a battery is first reacted with nitric acid to convert lead dioxides to lead nitrate, and in which lead sulfate is recovered from solution using sulfuric acid to so regenerate the nitric acid. Lead sulfate from the battery paste is subjected to alkali to precipitate lead oxides that are then, after removal of sulfate, converted to lead carboxylate as a raw material for lead monoxide. Unfortunately, the processes described in the '950 application are complex and may not always result in complete recycling and production of pure lead.

In another example, as described in U.S. Pat. No. 4,927,510, lead is recovered from battery paste in a combined process where the paste is first desulfinized and in which a lead precipitate is then subjected to leaching concentrated sulfuric acid. While such process also advantageously dissolves lead dioxide, various disadvantages remain. Among other things, leaching produces lead sulfate which must be recycled to the desulfunization process. Moreover, to recover the lead from the leachate, use of a fluorine containing electrolyte is required which is not only economically but also environmentally problematic. Still further, lead is deposited as a thick layer on the cathode under such conditions, which may redissolve into the electrolyte where the power supply is interrupted.

To overcome some of the difficulties associated with fluorine containing electrolytes, desulfurized lead active materials have been dissolved in methane sulfonic acid as described in U.S. Pat. Nos. 5,262,020 and 5,520,794. However, as lead sulfate is rather poorly soluble in methane sulfonic acid, and upstream pre-desulfurization is therefore still necessary. Likewise, others have contemplated processing of lead acid batteries without use of a fluorine containing electrolyte. For example, U.S. Pat. No. 4,107,007 teaches a process for recovering of lead from scrapped lead batteries using an alkaline solution with a polyol additive to convert lead oxide and sulfate to a solution having dissolved lead compounds. The so generated solution is subjected to electrowinning and lead is formed at the cathode as scarcely adherent spongy lead having relatively small particle sizes (about 20 micron). Unfortunately, the lead quality is poor as reported in U.S. Pat. No. 8,409,421, likely due to the presence of the additives. Moreover, the presence of sulfate in the electrolyte can be problematic where the electrolyte is recycled.

To address at least some of the difficulties associated with lead sulfate, oxygen and/or ferric methane sulfonate can be added to methane sulfonic acid as a leaching agent as taught in WO 2014/076544, or mixed oxides can be used as a starting material as described in WO 2014/076547. However, despite improved yield, various disadvantages nevertheless remain. Among other things, solvent reuse in these processes often requires additional purification steps, and residual sulfates are still lost as waste product. Additionally, and as noted before, plated metallic lead will dissolve back into the electrolyte during process interruptions (such as power outages which are not uncommon in electrolytic lead recovery), unless the cathode is retrieved from the electrolyte, rendering batch operation at best problematic.

Significant improvements have been disclosed in WO 2015/077227 where lead paste from lead acid batteries is dissolved in a solvent system comprising methane sulfonic acid and a chelator in substantial quantities. Notably, the solvent system allowed for digestion of both lead oxide and lead sulfate, and further allowed formation of elemental lead with very high purity. However, sulfate accumulation in the electrolyte will require solvent treatment where the solvent is recycled. Moreover, such systems tend to degrade the chelating agent at the anode, especially at prolonged operation.

In addition to the issues associated with yield, purity, and environmental concerns, the electrode materials for lead recovery are often expensive and/or operating conditions at the electrodes tend to promote formation of undesirable side products. For example, lead dioxide is frequently formed at the anode due to its capability to further oxidize. Such oxidation can become problematic as large quantities of insoluble lead dioxide ($PbO_2$) will typically lead to current limiting conditions and operational and economical inefficiencies. Likewise, all or almost all lead produced at the cathode from an acidic electrolyte is deposited as a thick film. Consequently, issues associated with redissolution into the electrolyte and low purity remain. Moreover, continuous production and harvesting of elemental (metallic) lead is not achieved in most known systems.

Thus, even though numerous methods for lead recycling are known in the art, all or almost all of them, suffer from one or more disadvantages. Therefore, there is still a need for improved devices and method fix smelterless recycling of lead acid batteries, especially in a closed loop and continuous manner. Moreover, cathodes are desirable that are inexpensive and allow for continuous lead harvesting.

Likewise, operating conditions are desired that avoid or reduce formation of undesirable side products or operating conditions at the anode.

SUMMARY OF THE INVENTION

The inventive subject matter is directed towards continuous electrochemical recovery of lead from lead ion containing solvents using a closed loop process in which high-purity lead is recovered, preferably as a micro- or nanoporous mixed matrix and typically using an aluminum cathode, all under conditions that minimize lead dioxide formation at the anode.

In one aspect of the inventive subject matter, the inventors contemplate a method of electrochemically producing high-purity lead that includes a step of desulfating lead paste using an alkaline process, and a further step of dissolving the desulfated lead paste in an acidic electroprocessing solvent to so form an acidic lead ion-enriched electroprocessing solvent. In yet another step, the lead ion-enriched electroprocessing solvent in brought in contact with a cathode and an anode, and lead ions in the lead ion-enriched electroprocessing solvent are reduced on the cathode under conditions effective to form adherent high-purity lead and a regenerated electroprocessing solvent. The adherent high-purity lead is removed from one portion of the cathode while more lead ions are reduced on another portion of the cathode. In such methods, at least some of the regenerated electroprocessing solvent is used in the step of dissolving the desulfated lead paste as the acidic electroprocessing solvent.

In some aspects of such methods, the cathode comprises aluminum, an aluminum alloy, or an aluminum powder embedded in a plastic, and/or at least a portion of the cathode has a passivation layer. Additionally, it is contemplated that the cathode is configured as a rotatable disc, a rotating cylinder, a moving belt, or a reciprocating plate. Alternatively, the cathode may also be configured to comprise a grid pattern or may further comprise an insulating material to form a pattered cathode. Where desired, the step of reducing may employ multiple cathodes operating at the same time in the same lead ion-enriched electroprocessing solvent.

In other aspects of such methods, it is contemplated that the anode is exposed to a reducing agent or a chelator during the step of reducing, or that the anode is a diffusion controlled anode or a hydrogen depolarized anode. Alternatively, the anode may also be separated from the cathode by a membrane and wherein the anode contacts an electrolyte other than the lead ion-enriched electroprocessing solvent. Still further it is contemplated that the anode may be operated such that the lead ion concentration at the anode is less than 50 g/L.

Most typically, the step of removing the adherent high-purity lead from the one portion of the cathode is performed while the one portion of the cathode is not in contact with the lead ion-enriched electroprocessing solvent, and/or the acidic electroprocessing solvent will comprise an alkane sulfonic acid (e.g., methane sulfonic acid).

Therefore, the inventors also contemplate a method for recycling a lead acid battery that includes a step of obtaining a first quantity of lead paste from the lead acid battery, wherein the lead paste comprises lead sulfate. In another step, the first quantity of lead paste is contacted with a base, thereby generating a supernatant and a first precipitate, wherein the first precipitate comprises lead hydroxide or lead carbonate, while in another step the supernatant is treated in an electrochemical cell, thereby generating a first product stream comprising sulfuric acid and a second product stream comprising a regenerated base. In yet a further step, the first precipitate is contacted with an electroprocessing solvent to generate a lead ion-enriched electroprocessing solvent, and the lead ion-enriched electroprocessing solvent is contacted with a cathode. An electrical potential is then applied to the cathode to form adherent metallic lead on the cathode and to produce a third product stream comprising a regenerated electroprocessing solvent, and the adherent metallic lead is collected from one portion of the cathode while the electrical potential is applied to the cathode. In a still further step, a second quantity of lead paste is contacted with at least a portion of the second product stream to generate a second precipitate, and the second precipitate is contacted with at least a portion of the third product stream.

In such methods it is contemplated that the cathode moves relative to the lead ion-enriched electroprocessing solvent while the electrical potential is applied, and/or that the cathode is configured as at least one of a rotatable disc, a belt, a rotating cylinder, and reciprocating plates, or that the cathode is configured to comprise a grid pattern. Most typically, the cathode is partially submerged in the lead ion-enriched electroprocessing solvent while the electrical potential is applied, and/or the cathode moves while the electrical potential is applied to thereby allow removal of metallic lead deposited on a portion of the cathode.

While not limiting to the inventive subject matter, it is contemplated that the cathode has a surface comprising aluminum or an aluminum alloy, and/or that the anode is a diffusion controlled anode or a hydrogen depolarized anode, and/or that the anode is exposed to a reducing agent or is separated from the cathode by a membrane. Moreover, it is contemplated that the electrochemical cell may comprise a cathode having a plurality of individually controllable cathode segments and an anode having a plurality of individually controllable anode segments. As noted above, it is further contemplated that the electroprocessing solvent comprises an alkane sulfonate, and/or that the adherent metallic lead forms a mixed matrix comprising hydrogen, electroprocessing solvent and high-purity lead and has a density of less than 8 g/cm3.

Consequently, the inventors also contemplate an apparatus for producing a micro- or nanoporous mixed matrix metallic composition that comprises an electrolytic cell configured to retain an acidic alkyl sulfonate electrolyte, an aluminum cathode coupled to the electrolytic cell such that the aluminum cathode is at least partially disposed in the acidic electrolyte during operation and discontinued operation, an anode coupled to the electrolytic cell such that the anode is at least partially disposed in the acidic electrolyte. Most typically, the cathode and anode are configured to allow at one portion of the cathode formation of an adherent metal from the electrolyte while allowing removal of the adherent metal from another portion of the cathode.

The acidic alkyl sulfonate electrolyte is preferably methane sulfonic acid, and it is further contemplated that the cathode has a passivation layer. As above, it is contemplated that the cathode may be configured as rotatable disc, a belt, a rotating cylinder, or reciprocating plates, and/or that the cathode may comprise multiple cathodes operating at the same time in the same lead ion-enriched electroprocessing solvent. While not necessary, it is also contemplated that the cathode may be configured to comprise a grid pattern, or that the cathode may also include an insulating material to form a pattered cathode.

With respect to the anode it is contemplated that the anode is exposed to a reducing agent, and/or that the anode is a diffusion controlled anode or a hydrogen depolarized anode.

Alternatively, the anode may also be separated from the cathode by a membrane, or be operated such that the lead ion concentration at the anode slows the kinetics of an oxidation reaction of lead oxide to lead dioxide at the anode.

Viewed from a different perspective, the inventors therefore also contemplate a method of electrodepositing lead from an acidic solution that includes a step of providing an electrolytic cell configured to retain an acidic electrolyte and a thither step of immersing an aluminum cathode at least partially in the acid electrolyte during operation and discontinued operation, wherein the aluminum cathode is coupled to the electrolytic cell. Such methods will further include a step of coupling an anode to the electrolytic cell such that the anode is at least partially disposed in the acid electrolyte, wherein the cathode and anode are configured to operate as an electrolytic cell, and yet another step of electrodepositing lead from the acidic electrolyte onto the cathode as adherent lead.

In at least some embodiments, it is contemplated that the aluminum cathode (typically having a passivation layer) is configured as at least one of a rotatable disc, a belt, a rotating cylinder, and reciprocating plates, and that the lead is in form of a micro- or nanoporous mixed matrix. Moreover, it is generally preferred that the step of electrodepositing lead is performed at one portion of the cathode at the same time as a further step of harvesting the deposited metal from another portion of the cathode. Most typically, such methods may operate the electrolytic cell in a continuous or discontinuous operation. Where desired, the aluminum cathode may be made of a plurality of cathode elements, and/or may further comprise insulating materials to form a pattered cathode or may be configured to comprise a grid pattern.

In yet another aspect of the inventive subject matter, the inventors contemplate a method of electrodepositing lead from an acidic solution that includes a step of providing an electrolytic cell configured to retain an acidic electrolyte, and a further step of immersing an anode and a cathode at least partially in the acidic electrolyte. In a further step, lead from the acidic electrolyte is electrodeposited onto the cathode as adherent metal, and the anode is configured or operated under conditions that reduces at least one of a current limiting condition during electrodepositing and formation of lead dioxide from lead oxide. For example, the anode may be configured as a diffusion controlled anode or a hydrogen depolarized anode, or operated under conditions that maintain lead ion concentration below 50 g/L. Alternatively, the anode may also be exposed to a reducing agent or a chelator, or may be operated under conditions that separate a catholyte compartment from an anolyte compartment, wherein anolyte compartment comprises sulfuric acid.

As noted above, it is also contemplated that the aluminum cathode may be configured as at a rotatable disc, a belt, a rotating cylinder, or as reciprocating plates. Most typically, the cathode will comprise in such methods aluminum, an aluminum alloy, or an aluminum powder embedded in a plastic.

Various objects, features, aspects and advantages of the inventive subject matter will become more apparent from the following detailed description of preferred embodiments, along with the accompanying drawing figures.

DETAILED DESCRIPTION

The inventors have discovered that recovery of lead from lead paste and various other lead-containing materials can be performed in a conceptually simple and effective electrolytic process that not only yields lead in highly pure form, but also allows for continuous operation using a low cost cathode while maintaining anode and solvent integrity. Also, contemplated systems and methods allow for a closed loop process in which all relevant process materials can be recycled and re-used within the process. Most advantageously, and viewed from a different perspective, high-purity lead can be obtained in a continuous process without the need for smelting or other high-temperature processing.

Figure 1:
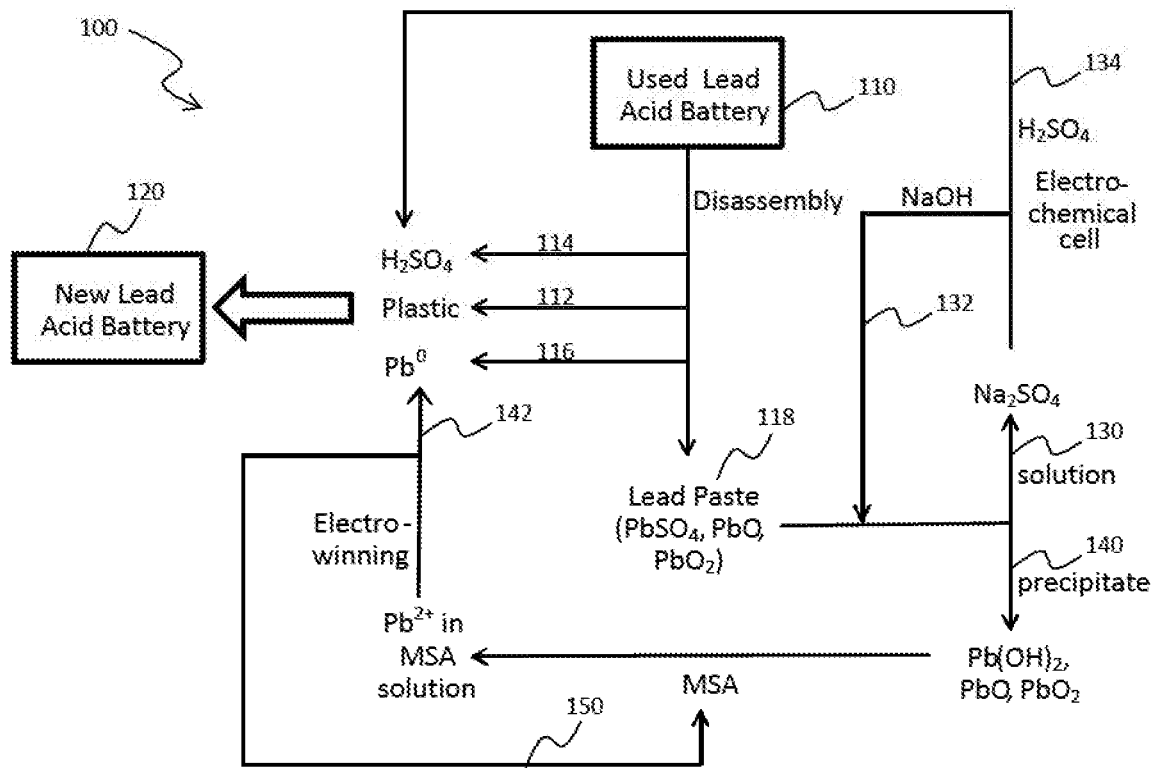
FIG. 1 is an exemplary schematic of a solution-based closed loop lead recycling process according to the inventive subject matter.

One exemplary closed loop process 100 is schematically shown in FIG. 1 in which lead acid batteries 110 are disassembled to yield plastic scraps 112, sulfuric acid 114, metallic lead (electrodes/grids) 116, and lead-containing paste 118 that includes $PbSO_4$, PbO, and $PbO_2$. The plastic scrap 112 can be recycled for production of newly formed batteries 120 (or other recycled plastic components), while recovered sulfuric acid 114 can be employed as electrolyte for new batteries 120. Metallic lead 116 can ingoted and formed into new grids or electrodes for new batteries 120, while the lead paste 118 is processed using an alkaline desulfurization step forming a sodium sulfate solution 130 and a lead oxide/hydroxide containing precipitate 140. The sodium sulfate solution 130 is preferably subjected to electrolysis to produce sodium hydroxide 132 that can be used for a subsequent alkaline desulfurization step of lead paste 118, and sulfuric acid 134 that can be used as electrolyte for newly formed batteries 120. The desulfurized lead precipitate 140 can then be dissolved in an acidic electroprocessing solvent 150 for electrolytic recovery of metallic lead 142 on a cathode, while the spent electroprocessing solvent 150 can be reused for dissolving additional desulfurized lead precipitate 140. Where the lead paste contains lead dioxide, the lead dioxide may be reduced (e.g., using hydrogen peroxide) to lead oxide before addition of the sodium hydroxide. Alternatively, lead dioxide may also be reduced after addition of sodium hydroxide or to lead dioxide after the step of dissolving the precipitate. Thus, it should be appreciated that all lead species (lead oxide, lead dioxide, and lead sulfate) may be recycled in a single integrated process that does not require smelting or undesirable solvents.

It should be appreciated that in contemplated processes ultimately all lead species from the active material lead can be processed as ionic lead in a suitable electrolyte, even where no chelator (e.g., EDTA) or other additive (e.g., no polyol compound, no dicarboxylic acid) is being used. Moreover, it should also be noted that all other components of a lead acid battery can be processed into a form that allows their reuse in the manufacture of more lead acid batteries. Thus, LABS can be processed in a closed loop system using environmentally friendly conditions that avoid toxic waste streams, smelting, or other gyro-metallurgical processes. Additionally, it should be recognized that electrochemically recovered lead from the acidic electrolyte has very high purity and that the metallic lead can be continuously harvested (i.e., can be removed from one portion of the cathode while lead ions are being reduced on another portion of the cathode). Thus, numerous difficulties otherwise associated with electrolytic recovery of lead from acidic solutions (e.g., purity, difficulty in removal from cathode, etc.) are entirely avoided.

Most typically, lead acid batteries are disassembled, which can be accomplished in an orderly fashion, for example by prying open the plastic casing of the battery or cutting the LABs carefully along the seams, followed by separation of the liquid components from the metallic lead electrodes and the lead sulfate containing paste. In such a process plastic casing and metallic lead electrode components can be rinsed (for example, using a basic solution as further described in more detail below) to remove adhering lead sulfate containing paste. Alternatively, a lead acid battery can be disassembled in a disorderly fashion, for instance by fragmentation or shredding. In such embodiments the plastic, metallic lead, and lead sulfate containing paste can be separated from each other following fragmentation by any suitable means, for example by settling or other density or weight-based process.

Upon separation of the plastic, the sulfuric acid, and metallic lead components from the disassembled battery materials, the remaining lead sulfate containing paste can be further processed. It should be appreciated that such fragmented solid materials can be treated with a base as described below to dislodge any clinging lead sulfate containing sludge, while in the same process generating lead hydroxide and a soluble sulfate salt solution that can be entered into subsequent processes as already described.

Lead paste is typically a mixture of predominantly $PbSO_4$, $PbO$, and $PbO_2$. In most heretofore known processes, the lead sulfate component is a troublesome contaminant that must be separately processed and so complicates downstream recovery of lead or is disposed of at a substantial loss of recoverable lead and recoverable sulfate. In contrast, the process according to the inventive subject matter includes a process where the lead sulfate containing paste is mixed with a base (e.g., NaOH or $NaCO_3$). Reaction with NaOH generates a reaction mixture that includes a supernatant and a precipitate. Advantageously, substantially lead-free sulfate (e.g., less than 2 wt %, more typically less than 1 wt %, most typically less than 0.1 wt %) is found in the supernatant in the form of soluble $Na_2SO_4$, while the solid precipitate comprises insoluble lead oxides and lead hydroxide $Pb(OH)_2$ that are essentially free of sulfate (e.g., less than 2 wt %, more typically less than 1 wt %, most typically less than 0.1 wt %). Thus, it should be appreciated that substantially all sulfate from the lead paste can be recovered and recycled to a process that ultimately generates sulfuric acid for a new battery while the lead component can be recycled in a process that does not accumulate sulfate in any meaningful quantities. Notably, where a segmented electrode electrolyzer is employed as is shown in FIG. 1, the purity of sulfuric acid and sodium hydroxide generated from the sodium sulfate solution is very high and no sulfate will 'leak' to the desulfurization step and so lead to potential increase of sulfate concentration.

As already noted above, extraction of lead paste recovered from the LABs during recycling, is preferably accomplished be application of a base. Bases that are suitable for use in the inventive concept are selected to provide soluble sulfate salts and insoluble lead salts. Suitable bases include metal hydroxides $M_x(OH)_y$, for which the corresponding metal sulfate $M_a(SO_4)_b$ is soluble. Suitable examples include Group I metal hydroxides (such as LiOH, NaOH and KOH). Other bases that provide soluble sulfate salts (i.e. soluble at greater than or equal to 10, 25, 50, 75, 100, 200, 400, 600, or 800 or more g/L) and insoluble (i.e. insoluble at 10, 3, 1, 0.3, 0.1, 0.03, 0.01 or less g/L) lead salts on reaction with $PbSO_4$, for example carbonates (such as $Na_2CO_3$ and $K_2CO_3$), are also suitable. It should also be appreciated that such bases can be used to rinse or otherwise clean plastic and metallic lead components recovered from a lead acid battery in order to dislodge and recover adhering lead sulfate containing paste, as part of the disassembly process. Thus, x and y in $M_x(OH)_y$ are typically independently between 1 and 3.

Most typically, addition of base is performed only to the extent needed for the sulfate exchange such that substantially all (e.g., at least 95%, more typically at least 98%) sulfate from lead sulfate is transferred into a soluble form without substantial formation of plumbate (e.g., less than 3 mol % of all lead species, more typically less than 1 mol %, most typically less than 0.1 mol % of all lead species entering desulfation). Therefore, in most aspects of the inventive subject matter, lead paste is subjected to desulfation using base at a strength of between about 1-6 N NaOH or $Na(CO_3)_2$.

Separation of the sulfate-containing, supernatant from the so formed lead-containing precipitate can be performed by any suitable method. For example, the supernatant can be separated from the precipitate by settling, centrifugal separation (e.g., in a hydrocyclone), and/or filtration. Suitable filters include filtration membranes and meshes, bed filters, press filters, and belt filter. Preferred separation methods are typically selected to efficiently separate the solid precipitate from the supernatant while facilitating recovery of the precipitate for subsequent processing. Thus, the precipitate will comprise less than 5 wt %, and more typically less than 3 wt % supernatant after separation.

After separation from the precipitate, the supernatant is then processed to generate sulfuric acid and to regenerate the base used in the treatment of the lead paste recovered from the recycled battery as shown above in FIG. 1. This is preferably accomplished through the use of an electrochemical cell. The so regenerated NaOH can be recovered and re-used for extraction of lead paste as part of a closed loop system. Similarly $H_2SO_4$ can be recovered from the anode, and subsequently used in any number of industrial processes. In a preferred embodiment, the recovered sulfuric acid is utilized in the manufacture of lead acid batteries. While any suitable configuration of electrochemical cells can be used, it is preferred that the electrochemical cell is configured to have a channel containing a segmented anode and a segmented cathode arranged along its length and separated by a anion exchange membrane or cation exchange membrane or electrodialysis membrane, where individual electrode segment pairs are individually controllable as described in U.S. Pat. No. 8,580,414. Such an arrangement is particularly advantageous as base is regenerated and sulfuric acid is produced at controlled and high purity in a single pass at high power efficiency. Therefore, viewed from a different perspective, it should be recognized that contamination of base with sulfate is advantageously very low and no accumulation of sulfate will occur in a process where the regenerated base is reused.

As also shown in FIG. 1, following separation from the supernatant, the precipitate can be processed to provide metallic lead. To that end, the precipitate is preferably dissolved in a solvent capable of solvating lead hydroxide and lead oxide(s) wherein that solvent is also stable under conditions used for electrowinning. Most preferably, suitable solvents have an acidic pH, and a preferred pH is equal or less than pH 6.0, equal or less than pH 5.0, equal or less than pH 4.0, equal or less than pH 3.0, or equal or less than pH 2.0. Therefore, contemplated pH ranges will be between 1-3, or between 2-4, or between 3-6, or between 1-5. In most preferred embodiments, the solvent is an alkane sulfonate (e.g., methyl sulfonate or MSA) that may also be halogenated. Still further suitable solvents for solubilizing the precipitate include perchlorates, amidosulfonates, hexafluorosilicates, tetrafluoroborates, and/or pyrophosphates. Such solvents can be provided as a solution in water. In such solutions the lead solvating species can range in concentration from 1 wt % to 20 wt %, or from 20 wt % to 40 wt %, or from 40 wt % to 60 wt %, or from 60 wt % to 80 wt %, or from 80 wt % to 100 wt %. For example, suitable solvents include aqueous solutions of MSA or pure MSA. In a preferred embodiment of the inventive concept the solvent does not include additional materials to enhance lead solubility, such as chelating agents, which can break down during electrodeposition and result in an increasing concentration of breakdown products in the solvent on repeated regeneration and re-use.

It should also be appreciated that the lack of sulfate salts in the precipitate (as a result from soluble sulfate formation upon base treatment of lead paste) advantageously prevents a buildup of sulfate in the solvent that reduces solvent efficiency upon re-use. In preferred aspects of the inventive subject matter, the solvated lead ions ($Pb^{2+}$) are recovered using an electrowinning process. In such processes metallic lead ($Pb^0$) collects on one or more cathodes that are in contact with the lead ion containing solution. While any suitable electrodeposition device can be used, it is generally preferred that the cathode or cathodes are configured to move relative to the electroprocessing solvent, advantageously permitting access to and recovery of metallic lead during electrolysis. After reduction at the cathode, the process will yield a high-purity solid lead (i.e., at least 98% purity, or at least 99% purity, or at least 99.5% purity, results not shown here) that forms a micro- or nanoporous mixed matrix enclosing hydrogen ($H_2$) and electrolyte. Where the electrolyzes has one or more moving electrodes, and especially rotating disk shaped electrodes, lead is deposited as adherent but non-film forming lead as discussed in more detail below.

As used herein, the terms "adherent" or "weakly associated" in conjunction with metallic lead that was formed by reduction of ionic lead refers to a form of lead that is not a coherent film, over the surface of the cathode, but that is amorphous and can be wiped off the cathode. In other words, a weakly associated or adherent lead product does not form in a macroscopic dimension intermetallic bonds between the cathode and the lead product and will therefore not form a coherent lead film on the cathode. For example, by observation in most experiments, lead formed in a spongy low density layer that was loosely attached to the cathode, floated off a static plate cathode, and could be washed off the surface of a rotating cathode if electrolyte circulation was too aggressive.

Most notably, the inventors discovered that the MSA can be recycled hack into the process after depletion of lead without purification. However, mechanical processing (e.g., filter, centrifuge, hydroclone, etc.) to remove any solids, and/or chemical processing (e.g., by precipitation of sulfates, for example, to produce calcium or strontium sulfate), and/or adsorptive processing (e.g., activated charcoal, ion exchange resin, etc.) is also contemplated herein.

Figure 2:
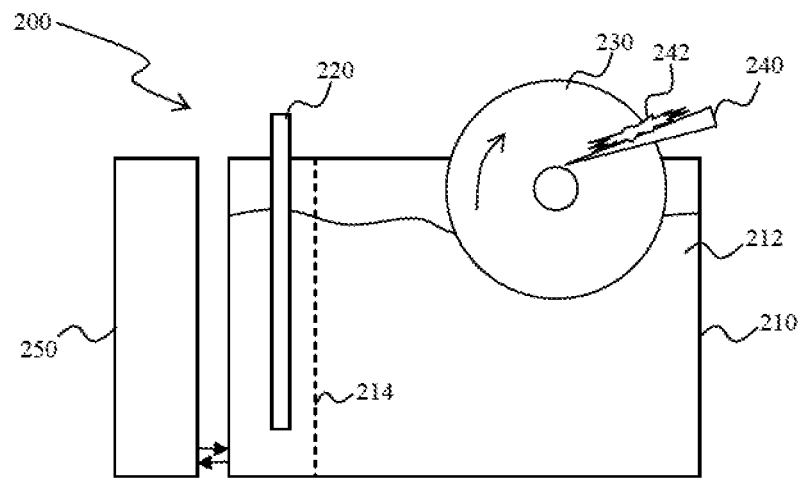
FIG. 2 is an exemplary schematic of a device for producing a micro- or nanoporous mixed matrix metallic composition according to the inventive subject matter.

Therefore, and viewed from a different perspective, the inventors also contemplate an electrolyzer for producing high-purity (e.g., at least 98 mol %, or at least 99 mol % purity) lead from a lead ion-enriched electroprocessing solvent. Of course, contemplated electrolyzers may be configured in numerous manners. However, it is typically preferred that the anode and cathode are disposed in the same cell without a separator, that the anode is a titanium anode that is coated with a metal oxide an example of which is iridium oxide, and/or that the cathode is an aluminum cathode as discussed in more detail below. Moreover, it is also generally preferred that the cathode is an aluminum cathode that is configured to move relative to the lead ion-enriched electroprocessing solvent (e.g., configured as a rotating disk shaped cathode, preferably rotatable at a speed that allows formation of weakly associated high-purity lead in a micro- or nanoporous mixed matrix on the disk shaped cathode). Where desired, a harvester surface may be positioned proximal to the cathode to remove adherent high-purity lead in a non-peeling manner. FIG. 2 exemplarily and schematically depicts an electrolyzer 200 suitable for use herein in which the electroprocessing solvent tank 210 contains methane sulfonic acid 212 as electrolyte and wherein lead ions are dissolved in the electrolyte. An optional solvent reservoir 250 is fluidly coupled to the tank 210 to supply fresh electroprocessing solvent that is enriched in lead ions. Anode 220 is at least partially immersed in the solvent 212 and separated by optional separator 214. Metallic lead is formed in the lower portion of the rotating cathode 230 that is immersed in the solvent 212, while the formed metallic lead is harvested on the upper portion of the rotating cathode 230 using a scraper 240 as mixed matrix material 242 as also further discussed in more detail below. Advantageously, due to the rotating cathode 230, metallic lead can be formed from the lead ions on one portion of the cathode while earlier formed metallic lead can be removed at the same time from another portion of the cathode, thus enabling continuous production of metallic lead from an electrolyte. Alternatively, it should be noted that the processes can also be performed in a batch manner without a moving cathode.

Current applied to a cathode is typically, among other parameters, a function of the lead ion concentration and the cathode's surface area and can range from 100 $A/m^2$ to 2000 $A/m^2$. For example, suitable current densities include 100 $A/m^2$ to 200 $A/m^2$, or 200 $A/m^2$ to 500 $A/m^2$, or 500 $A/m^2$ to 1000 $A/m^2$, or 1000 $A/m^2$ to 2000 $A/m^2$. In some embodiments (for example, in continuous processes) the current applied to the cathode is constant. However, in other embodiments of the inventive concept the current may also be adjusted as reduction of lead at the cathode progresses.

With respect to suitable cathodes it should be recognized that numerous geometries, and especially disk cathodes are contemplated. However, other geometries include patterned cathodes or cathodes with insulating portions to form a grid. Therefore, the dimensions of the cathodes may range from millimeters to meters depending on the scale of the process. For example, suitable diameters of aluminum disk cathodes can range from 1-5 cm, 5-10 cm, 10-20 cm, 20-50 cm, 50-100 cm, 1-2.5 m, 2.5-5 m, 5-10 m, or even larger. Similarly, where the cathodes are configured as movable segmented belts, the belts may be 10 mm to 100 mm, or 100 mm to 1 m, or 1 m to 5 m (or more) wide with circumferences ranging from 100 cm to tens of meters.

Figure 3:
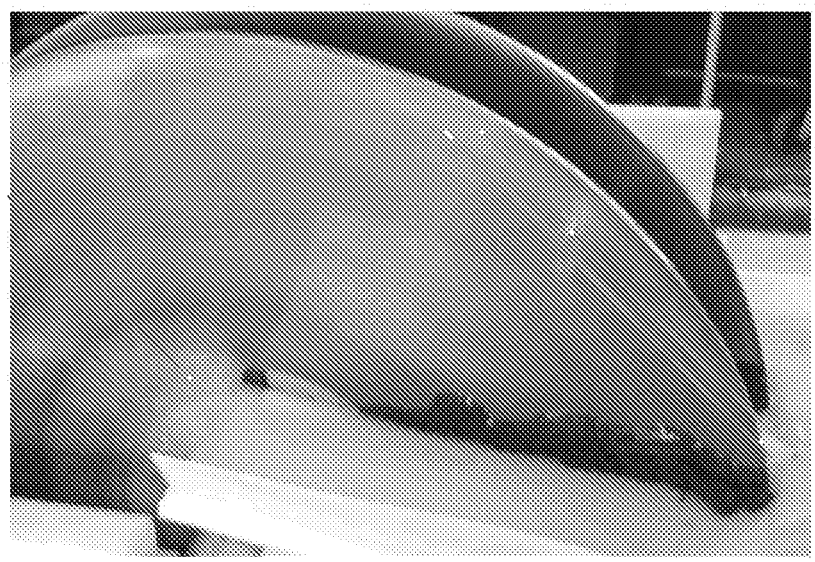
FIG. 3 is an exemplary detail view of a rotating cathode with lead compositions formed by the process according to the inventive subject matter.

In still further contemplated embodiments of the inventive subject twitter, multiple cathodes may be employed in series or in parallel. For example, as shown in FIG. 3, a pair of rotating aluminum discs are employed as cathodes. In another embodiments, two, three, four, or more grid-patterned cathodes are positioned within the electrochemical cell so that when a voltage is applied, lead deposits on each cathode simultaneously. Moreover, it is generally preferred that the cathode is a cathode that is configured to move relative to the lead ion-enriched electroprocessing solvent. For example, suitable cathodes may be configured as rotating disk shaped cathodes, preferably rotatable at a speed that allows formation of weakly associated high-purity lead in a micro- or nanoporous mixed matrix on the dish shaped cathode). Where desired, a harvester surface maybe positioned proximal to the cathode to remove adherent high-purity lead in a non-peeling manner. Notably, the so formed micro- or nanoporous mixed matrix can be removed from the cathode simply by bringing a wiping surface in close proximity to the cathode (e.g., about 1 mm distance). As soon as the micro- or nanoporous mixed matrix has grown to a thickness that reaches the wiping surface, the micro- or nanoporous mixed matrix will engage with the surface and act as a collection element that then harvests further micro- or nanoporous mixed matrices as they accumulate on the cathode surface.

Therefore, it is preferred that the cathodes are configured to concurrently perform two distinct processes, namely reduction of an ionic species of a metal to elemental metal at one portion of the cathode and removal of the so formed elemental metal at another portion of the cathode, all at the same time. For example, in one preferred aspect, the cathode is configured as a semi-submerged rotating disc with a proximal scraper to remove newly formed metallic lead as shown in FIG. 3. However, alternative configurations will include reciprocating plate shaped cathodes, belt-like cathodes, and drum/cylinder shaped cathodes.

In order to facilitate collection of deposited lead in some embodiments, the cathode has preferably a surface to which the deposited metallic lead does not strongly adhere. Such a surface permits collection of metallic lead by a straightforward scraping mechanism, such as a blade that is positioned at or near the collection cathode surface or an aperture with an edge that is similarly positioned. As noted above, collection of the deposited lead metal can be continuous (i.e. throughout electrodeposition) or intermittent. A reduced adhesion surface can be provided by application of an adhesion reducing layer to the surface of a cathode or can be provided by the material of the cathode itself. For example, in a preferred embodiment, the cathode is made of aluminum or will comprise an aluminum surface, where the aluminum oxide layer that forms on exposure to air provides a surface with reduced adhesion.

Figure 4:
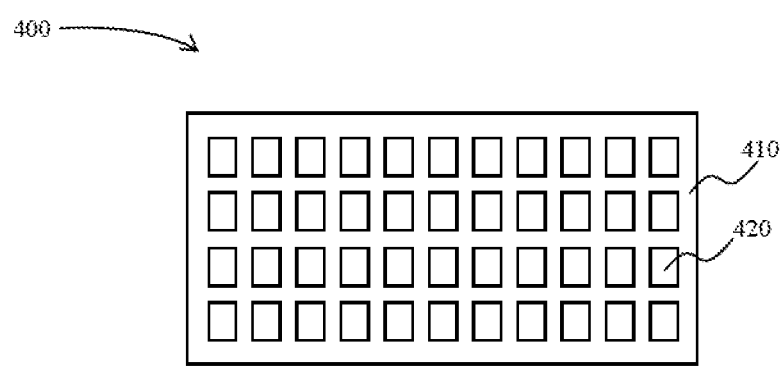
FIG. 4 is an exemplary schematic of a patterned cathode according to the inventive subject matter.

Another benefit of employing aluminum cathodes in contemplated lead recovery systems and methods is that aluminum is easily patterned or machined. Using conventional techniques, aluminum may be cast or formed into a wide variety of shapes suitable far electrodepositing materials. In same contemplated embodiments, aluminum cathodes may be cast or machined into rectangular slabs, rods, discs, or grids. In other aspects, the aluminum may also be segmented or layered with insulating materials to form patterned cathodes. For example, FIG. 4 exemplarily depicts a patterned cathode 400 that includes a conductive aluminum portion 410 and a plurality of raised insulating portions 420 that can be used to produce a lead, deposit having the shape of a grid. In other embodiments, aluminum cathodes may also be shaped to allow the electrolyte to circulate around the cathode. For example, cathodes may be circular, reciprocating, or configured for continuous linear motion (e.g., in form of a flexible belt or segmented track).

It should further be appreciated that a cathode of the inventive concept can be made of a single material (for example aluminum) or can be constructed as a composite. For example, a cathode can be constructed of a conductive core material (e.g., steel, copper, graphite, or a conductive polymer) and a conductive but non-adhesive outer material (e.g., aluminum and the attendant coating of aluminum oxide). Alternatively, suitable cathodes can have a non-conductive core (for example polymer/plastic, cellulosic material, and/or fiberglass/resin material) that is clad or otherwise coated with a non-adhesive and conductive outer layer (e.g., aluminum).

Surprisingly, the inventors have found that when aluminum is used as a cathode, lead is not deposited as a cohesive, tightly bound layer on the cathode surface. Rather, lead was found to deposit on the cathode as a loose, slightly adherent, amorphous dark mass. On examination the collected lead was found to have lower density than traditional metallic lead (11.34 g/cm$^3$). Indeed, the density of the collected material was found to range from about 5 g/cm$^3$ to less than 1 g/cm$^3$, with lower density material readily collectable by flotation. When pressure was applied to the amorphous mass it compressed easily and gained a metallic sheen. Without wishing to be bound by theory, the inventors believe that in processes of the inventive concept metallic lead deposits on an aluminum cathode in a dendritic fashion rather than as a continuous, adhesive surface layer as found in traditional electroplating, and in doing so traps hydrogen (H$_2$) gas that is generated during the electrodeposition process. This results in the formation of a porous amorphous mass of metallic lead with entrapped hydrogen that is readily gathered from the collection cathode. It should also be appreciated that the incorporation of hydrogen into the mass serves to prevent (for the majority of the lead so collected) the formation of unwanted lead oxides.

Contemplated lead mixed matrices are thought to have a formula of Pb$_l$(H$_2$)$_m$(MSA)$_n$, wherein MSA is methane sulfonic acid, and wherein l, m, and n denote molar fractions, wherein l and n are independently between 0.1 and 1, and m is between 0.05 and 0.0005. Thus, the lead to hydrogen ratio is typically between 500:1 and 50:1, and most typically between 300:1 and 100:1. Viewed from a different perspective, l, m, and n may also be such that the lead composite or mixed matrix will have a density of between 8-10 g/cm$^3$, or between 6-8 g/cm$^3$, or between 4-6 g/cm$^3$, or between 2-4 g/cm$^3$, or between 1-2 g/cm$^3$, or even less. Of course, it should be appreciated that numerous alternate solvents instead of MSA are also deemed suitable, and appropriate solvents include those noted above.

The inventors also surprisingly discovered that aluminum can be used as a cathode material in a process where reduction of a metal is performed in an acidic medium under conditions that the PHOSITA would expect the cathode to pit, corrode, and ultimately dissolve. While not wishing to be bound by any theory, the successful application of aluminum as a cathode material for lead plating may be attributed to the formation of a passivation layer. Such passivation layers may protect the aluminum from formation of aluminum methane sulfonate salts in methane sulfonic acid (MSA), even when a current is applied. The passivation layer may comprise aluminum oxide, possibly is association with lead, lead oxide, and/or other alloy. Moreover, the thickness of the passivation layer may range from 0.1-1 µm, 1-100 µm, 100-200 µm, 200-500 µm or more, and in most cases, passivation layers are expected to have a thickness of between 10-20 μm. Nucleation of elemental lead via reduction of lead ions likely takes place at defects in the passivation layer, or via tunneling effects through the insulating passivation layer, which may lead to the observed micro- and/or nanostructured mixed matrices rather than the formation of a smooth and tightly bound layer of lead at the cathode.

While not wishing to be bound by any theory, it is also contemplated that the use of MSA instead of sulfuric acid may contribute to the stability of aluminum cathodes under electrolytic conditions for lead reduction. Because the aluminum surface is likely protected by a passivation layer and possibly nucleating lead, most MSA probably preferentially associates with lead ions rather than attacking the passivation layer. Surprisingly, the aluminum cathode remained in substantially original condition while in contact with MSA, even when no current was applied over extended periods. Such remarkable effect may indeed be due to a pickling in acid that helps complete or perfect a passivation layer. Therefore, the inventors also, contemplate that the surface of the aluminum cathode may be treated in a pickling process (e.g., with acids or bases, such, as nitric, phosphoric, or hydrofluoric acids, sodium/potassium hydroxide, etc.). Moreover, the aluminum cathode and passivation layer advantageously support high current densities.

Consequently, it should be appreciated that aluminum may be intentionally passivated to increase or otherwise improve cathode stability. For example, aluminum can be passivated by various degreasing and pickling methods, and especially preferred degreasing methods include those using solvents (e.g., methylene chloride, trichloroethane, etc.), mechanical polishing agents and thermal methods. Likewise, pickling, of aluminum can be achieved using various acids and bases, and particularly suitable acids include nitric acid, hydrofluoric acid, phosphoric acid, and all reasonable combinations thereof (e.g. treatment over several hours and elevated temperature). Alternatively, or additionally pickling can be achieved using various caustic solutions, typically sodium and/or potassium hydroxide. Advantageously, pickling conditions and agents can be selected to achieve a particular surface roughness.

The inventors also contemplate that various other aluminum based cathodes may be successfully employed in the electrowinning of metals from acidic media. For example, aluminum alloys, and other aluminum composite materials may serve as suitable cathode materials. Exemplary aluminum alloys include alloys of aluminum and at least one of magnesium, copper, manganese, tin, silicon, chromium, zinc, vanadium, titanium, bismuth, gallium, lead aid zirconium. On the other hand, where other non-metallic components are desired for combination with aluminum to so form a composite material, it is contemplated that suitable composite materials various plastic materials (e.g., thermoplastic polymers), one or more inorganic materials (e.g., ceramics). The so formed composite materials may be configured as lamellar structures in which aluminum is layered with the plastic or other materials, or as mixed phase materials in which aluminum is substantially homogenously distributed. In still further aspects, other metal structures may be coated, clad, or otherwise coupled to an aluminum layer (e.g., formed as a foil) for use in such processes. For example, suitable metal structures may be formed from copper, ferrous materials, or even conductive plastics.

While typically used for electrochemical recovery of elemental lead from lead ion rich solutions, it is contemplated that the methods described herein can be used to produce similar elemental (and mixed, matrix) compositions from other metal ions, including, indium, tin, lead, thallium, bismuth, cadmium, antimony silver, zinc, copper, cobalt, and nickel, among others. Each of these metal compositions can be formed individually or in combination.

In other contemplated aspects of the inventive subject matter, and with further respect to the electrodes in the electrolyzer it should be appreciated that numerous anode materials are deemed suitable for use herein. Indeed, it should be noted that all conductive materials are considered suitable for use in conjunction with the teachings herein so long as such materials are compatible with the electrochemical conditions used in the process. Therefore, and among other contemplated materials, suitable anodes include various metals, carbon forms/allotropes (e.g., graphite, glassy carbon, or grapheme), and matrices comprising at least one polymer and one form of carbon. For example, especially preferred anodes will be titanium anodes, which may be coated with ruthenium oxide (or other metal oxide). Alternatively, Magneli Phase sub-oxides of titanium ($Ti_xO_{(2x-1)}$ with x between 4 and 11) have been discovered to be stable anode materials in electrolytes of similar composition to the electroprocessing solvent and are contemplated for use as anode materials and passivation resistant coatings on anodes. Still further, and as already noted before, the anode(s) may be disposed in the same electrolyte with or without a separator membrane between the anode and cathode, or may be disposed in an anode compartment, and where desirable, in contact with an anolyte that is chemically distinct from the catholyte.

In a typical lead recovery process according to the inventive subject matter, lead ions in the lead ion-enriched electroprocessing solvent are also subject to oxidation at the anode and will form ultimately $PbO_2$, which reduces the availability of PbO. Thus, the oxidation reaction of PbO at the anode can act as a current limiting condition, which reduces the efficiency of the lead recovery process. The inventive subject matter is therefore also directed to various systems and methods of improving operational performance in electrochemical recovery of lead, and especially as it relates to preventing current limiting conditions and/or degradation of operational performance of the anode of an electrolyzer. Viewed from a different perspective, the inventive subject matter is drawn to reducing the net oxidation reactions of lead oxide (PbO) to lead dioxide ($PbO_2$) and/or reducing $PbO_2$ deposition at the anode of the electrolyzer to so increase efficiency of lead recovery.

The inventors discovered that the net effect of this undesired side reaction can be dramatically reduced by several different approaches: 1) providing redox agents to the lead ion-enriched electroprocessing solvent, such that the redox agents reduce insoluble $PbO_2$ to PbO at the anode, 2) separating anolyte and catholyte in the electrolyzer, where the anolyte contains no lead compounds, 3) reducing the lead concentration in the anolyte and/or catholyte such that oxidation reaction kinetics are significantly slowed down, 4) using an hydrogen depolarization anode, where the depolarized hydrogen reduces $PbO_2$ to PbO, and 5) using an anode, in which at least a portion of the anode is covered by a porous, diffusion-prevention material. The inventors contemplate that one or more of the above described methods and/or devices can be combined in order to provide even greater efficiencies.

For example, in one particularly contemplated aspect of the inventive subject matter EDTA is employed as a reducing reagent as it can be stable under the operating conditions (e.g., temperature, pH, etc.) present at the anode. Advantageously, EDTA can also act as a chelating agent for lead where lead sulfate is present in the active materials as described above. At the anode, $PbO_2$ can be reduced to PbO by a concurrent oxidation of EDTA. Because $PbO_2$ is reduced to PbO by oxidation of EDTA while PbO is oxidized to $PbO_2$ at the anode, addition of EDTA to the electroprocessing solution can significantly reduce the deposition of insoluble $PbO_2$ at the anode during the redox reaction of the electrowinning. Viewed from another perspective, preferred reducing or redox agents include those that are substantially stable under lead recovery/deposition conditions. For example, EDTA may be partially or completely replaced by other reducing reagents including, ethylene glycol tetra acetic acid (EGTA), tris(2-carboxyethyl) phosphine (TECP) dithiothreitol (DTT), carbon, thioglycolic acid (TGA), borohydride, hydrogen peroxide, compounds containing the $Sn^{2+}$ ion, such as tin(II) chloride, and 2-mercaptoethanol (BME). Furthermore while it is contemplated that suitable redox agents will be sacrificial redox agents, regenerable redox agents are also especially contemplated herein.

It is further preferred that the reducing reagents are at least 70%, 80%, 90%, or 95% (by weight) soluble and non-volatile at the reaction temperature of the electrolyzes, most typically between 20 and 40 degree Celsius and at the reaction pH, typically between pH 5-7, or between pH 1-3, or between pH 3-5. Moreover, it is preferred that the concentration of the reducing reagent is in excess over the concentration of $PbO_2$ at the anode/in the lead ion-enriched electroprocessing solvent. In most circumstances, the reducing reagents will be added to the lead ion-enriched electroprocessing solvent in a significant concentration, typically at least twice the amount of anticipated $PbO_2$, more typically at least five times the amount of anticipated $PbO_2$, even more typically at least ten times the amount of anticipated $PbO_2$ and most typically at least twenty times of the amount of anticipated $PbO_2$ in lead ion-enriched solvent.

Alternatively, and especially where addition of reducing agents is not desired, fluidly separate containers for the anode and cathode may be used, where the anolyte in the anode container is preferably devoid of lead ions. Most typically, such containers will be fluidly separated from the cathode compartment by a diaphragm (e.g., Nation membrane) as is well known in the art. The lead ion-enriched electrolyte is then used as catholyte. Advantageously, the catholyte can be recirculated for increased lead recovery while the anode may or may not be recirculated. In such configurations, it is especially preferred that the anolyte contacting with the anode is an aqueous acidic solution (e.g., MSA, sulfuric acid, etc.), which contains substantially no lead compounds. For example, the anolyte could be sulfuric acid (e.g., that was obtained from the electrolysis of the sodium sulfate solution from desulfation) with a PbO concentration of less than 1 g/L, more typically less than 0.5 g/L, or most typically less than 0.1 g/L. Exemplary compositions of suitable cathodes, electrolytes, and anodes are discussed in more detail in U.S. Pat. No. 7,368,043, which is incorporated herein in its entirety. Such approach is conceptually simple and effective since the anolyte contains substantially no PbO or other lead species that could lead to formation of $PbO_2$, however, may render the device somewhat more complex.

To avoid increase in complexity, systems and methods contemplated herein may also be operated at a relatively low lead ion concentration (e.g., less than 50 g/l). The inventors have discovered that such methods and systems may advantageously be operated with various electrochemical cells. However, particularly preferred cells include those that require no separator, and most preferably, the lead is present in the electroprocessing solvent at a sufficiently low concentration to effectively slow the kinetics of the oxidation reaction of PbO to insoluble $PbO_2$. For example, in an especially preferred aspect of the inventive subject matter, the lead concentration in the electroprocessing solvent (e.g., alkane sulfonic acid such as MSA) will in most circumstances be below 50 g/L, more typically at a concentration below 30 g/L, and most typically at a concentration below 20 g/L. For example, suitable lead concentrations include those between 1-50 g/l, between 10-20 g/l, between 10-30 g/l, or between 30-50 g/l.

Such approach is especially advantageous as the electrolyzer does not require separate containers for the cathode and the anode and therefore significantly reduces costs. However, it should be noted that separate containers are also deemed suitable and includes those that allow for a higher lead ion concentration, in the catholyte as compared to the anolyte. In such systems and devices, the lead concentration in the anolyte is typically below 50 g/L, more typically below 30 g/L, and most typically below 20 g/L. For example, suitable lead concentrations in the anolyte include those between 1-50 g/l, between 10-20 g/l, between 10-30 g/l, or between 30-50 g/l, while the lead concentration in the catholyte is typically above 50 g/L, or above 75 g/L, or above 100 g/L, or above 150 g/L, or above 200 g/L (e.g., between 50-150 g/L, or between 70-200 g/L).

In yet another aspect of the inventive subject matter, it is contemplated that current limiting or other adverse conditions during electrowinning may also be avoided by use of a porous or non-porous hydrogen depolarized anode. For example, a typical electrolyzer may include a cell containing a lead ion-enriched electroprocessing solvent, a cathode (e.g., most preferably an aluminum cathode) and a hydrogen depolarized anode. Of course, the hydrogen depolarized anode and cathode are at least partially disposed in the cell to allow contact of the anode and cathode with the lead ion-enriched electroprocessing solvent.

During the reduction-oxidation reactions in the cell, substantial amounts of molecular hydrogen ($H_2$) are generated or provided in a separate stream. The inventors contemplate that this molecular hydrogen can be depolarized at the hydrogen depolarized anode to form $2H^+$, which is a strong enough reducing agent to reduce $PbO_2$. As a result, the hydrogen ions reduce $PbO_2$ form PbO at the anode, which in turn reduces the net deposition of insoluble $PbO_2$ at the anode, thereby prevents current-limiting condition at the anode. Where desired, hydrogen could be extracted from the mixed matrix material that recovered from the cathode. Alternatively, hydrogen may be separately prepared or supplied from a commercial hydrogen source (e.g., compressed or liquefied $H_2$). For example, suitable hydrogen depolarized anodes may include a carbon material (e.g., graphite felt, glassy carbon). However, it is also contemplated that various other configurations and designs of the hydrogen depolarized anode can be used so long as such compositions and designs are stable under the operating conditions (e.g., temperature, pH, etc.) used for lead recovery.

Alternatively, current limiting or other adverse, conditions during lead recovery may be avoided or reduced using anode configurations in which at least a portion of the anode is covered by a porous diffusion-retarding material, which reduces the availability of lead oxide (PbO) from the electrolyte and so forms a barrier to replenishment of PbO. Because PbO is prevented from readily reaching the anode, the rate of PbO oxidation to $PbO_2$ at the anode is significantly decreased, which in turn will substantially decrease the deposition of insoluble $PbO_2$ at the anode. It is generally preferred that the porous diffusion-prevention material has a mesh-like, porous, and/or channeled structure. In most circumstances, it is contemplated that the mesh-like structure has a mesh or pore size of less than 3 mm, more typically less than 1 mmm, or most typically less than 0.5 mm. While any type of mesh-like and/or porous material can be considered for diffusion-prevention material, it is especially preferred that the porous, diffusion-prevention material is made of natural fibers (e.g., cellulose, cotton, wool, kapok, etc.). It is also contemplated that the porous, diffusion-prevention material can be also made of synthetic polymers including polyesters, nylons, polypropylene, etc.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of electrochemically producing high-purity lead, comprising:
    desulfating lead paste using an alkaline process, wherein the desulfating further includes a step of reacting the lead paste or desulfated lead paste with hydrogen peroxide to reduce lead dioxide to lead oxide and to so generate a lead oxide-containing desulfated lead paste;
    dissolving the lead oxide-containing desulfated lead paste in a methane sulfonic acid solvent to so form an acidic lead ion-enriched electroprocessing solvent, and contacting the lead ion-enriched electroprocessing solvent with a cathode and an anode, wherein the cathode has a surface comprising aluminum, an aluminum alloy, or an aluminum powder embedded in plastic and at least a portion of the cathode comprises a passivation layer, wherein the passivation layer is at least 0.1 μm thick;
    reducing lead ions in the lead ion-enriched electroprocessing solvent on the cathode under conditions effective to form adherent high-purity lead and a regenerated electroprocessing solvent;
    removing the adherent high-purity lead from one portion of the cathode while lead ions are reduced on another portion of the cathode, wherein the high-purity lead has a purity of at least 98%; and
    using at least some of the regenerated electroprocessing solvent in the step of dissolving the lead oxide-containing desulfated lead paste as the acidic electroprocessing solvent.

2. The method of claim 1 wherein the cathode is configured as a rotatable disc, a rotating cylinder, a moving belt, or a reciprocating plate.

3. The method of claim 1 wherein the step of reducing uses multiple cathodes operating at the same time in the same lead ion-enriched electroprocessing solvent.

4. The method of claim 1 wherein the anode is exposed to a reducing agent or a chelator during the step of reducing.

5. The method of claim 1 wherein the anode is a diffusion controlled anode or a hydrogen depolarized anode.

6. The method of claim 1 wherein the anode is separated from the cathode by a membrane and wherein the anode contacts an electrolyte other than the lead ion-enriched electroprocessing solvent.

7. The method of claim 1 wherein the anode is operated such that a lead ion concentration at the anode is less than 50 grams per liter.

8. The method of claim 1 wherein the step of removing the adherent high-purity lead from the one portion of the cathode is performed while the one portion of the cathode is not in contact with the lead ion-enriched electroprocessing solvent.

9. The method of claim 1, wherein the high-purity lead forms a micro- or nanoporous mixed matrix enclosing hydrogen ($H_2$) and electrolyte.

10. A method for recycling a lead acid battery, comprising:
    obtaining a first quantity of lead paste from the lead acid battery, the lead paste comprising lead sulfate;
    contacting the first quantity of lead paste with a base, thereby generating a supernatant and a first precipitate, wherein the first precipitate comprises lead hydroxide or lead carbonate;
    reacting the first quantity of lead paste or the first precipitate with hydrogen peroxide to reduce lead dioxide to lead oxide to so generate a first lead oxide-containing first precipitate;
    treating the supernatant with an electrochemical cell, thereby generating a first product stream comprising sulfuric acid and a second product stream comprising a regenerated base;
    contacting the first lead oxide-containing precipitate with methane sulfonic acid to generate a lead ion-enriched electroprocessing solvent, and contacting the lead ion-enriched electroprocessing solvent with a cathode and an anode, wherein the cathode has a surface comprising aluminum or an aluminum alloy and at least a portion of the cathode comprises a passivation layer, wherein the passivation layer is at least 0.1 μm thick;
    applying an electrical potential to the cathode to form adherent metallic lead on the cathode and to produce a third product stream comprising a regenerated electroprocessing solvent;

collecting the adherent metallic lead from one portion of the cathode while the electrical potential is applied to the cathode, wherein the adherent metallic lead has a purity of at least 98%;

contacting a second quantity of lead paste with at least a portion of the second product stream to generate a second precipitate; and contacting the second precipitate with at least a portion of the third product stream.

11. The method of claim 10, wherein the cathode moves relative to the lead ion-enriched electroprocessing solvent while the electrical potential is applied.

12. The method of claim 10, wherein the cathode is configured as at least one of a rotatable disc, a belt, a rotating cylinder, and reciprocating plates, or wherein the cathode is configured to comprise a grid pattern.

13. The method of claim 10, wherein the cathode moves while the electrical potential is applied to thereby allow removal of metallic lead deposited on a portion of the cathode.

14. The method of claim 10, wherein the anode is a diffusion controlled anode or a hydrogen depolarized anode, wherein the anode is exposed to a reducing agent or is separated from the cathode by a membrane.

15. The method of claim 10, wherein the electrochemical cell comprises a cathode having a plurality of individually controllable cathode segments and an anode having a plurality of individually controllable anode segments.

16. The method of claim 10, wherein the adherent metallic lead forms a mixed matrix comprising hydrogen, electroprocessing solvent and high-purity lead and has a density of less than 8 g/cm$^3$.

17. The method of claim 10, wherein the adherent metallic lead forms a micro- or nanoporous mixed matrix enclosing hydrogen ($H_2$) and electrolyte.

* * * * *